(12) United States Patent
Kyle

(10) Patent No.: US 6,247,068 B1
(45) Date of Patent: Jun. 12, 2001

(54) WINSOCK-DATA LINK LIBRARY TRANSCODER

(75) Inventor: David Kyle, Austin, TX (US)

(73) Assignee: Advanced Micro Devices Inc., Sunnyvale, CA (US)

( * ) Notice: Subject to any disclaimer, the term of this patent is extended or adjusted under 35 U.S.C. 154(b) by 0 days.

(21) Appl. No.: 08/915,554

(22) Filed: Aug. 21, 1997

Related U.S. Application Data

(60) Provisional application No. 60/040,113, filed on Mar. 7, 1997.

(51) Int. Cl.[7] .................................................. G06F 9/00
(52) U.S. Cl. ................................................. 709/328
(58) Field of Search .................... 709/303, 300, 709/228, 200, 328, 310, 236; 370/466

(56) References Cited

U.S. PATENT DOCUMENTS

| | | | |
|---|---|---|---|
| 5,142,622 | * | 8/1992 | Owens ............................ 709/227 |
| 5,537,417 | * | 7/1996 | Sharma et al. ....................... 709/228 |
| 5,568,487 | * | 10/1996 | Sitbon et al. ........................ 370/446 |
| 5,600,844 | * | 2/1997 | Shaw et al. .......................... 395/800 |
| 5,721,876 | * | 2/1998 | Yu et al. .......................... 395/500.48 |

OTHER PUBLICATIONS

M. Terada, et al, "A High Speed Protocol Processor to Execute OSI", IEEE, pp. 944–949, Mar. 1991.*

M. Terada, et al, "A High Speed Protocol Processor to Execute OSI", IEEE, pp. 944–949, Mar. 1991.*

* cited by examiner

*Primary Examiner*—Majid Banankhah
*Assistant Examiner*—Sue Lao
(74) *Attorney, Agent, or Firm*—Foley & Lardner

(57) ABSTRACT

A hardware accelerator for performing Winsock protocol acceleration uses hardware decoders each configured to perform decoding for a particular protocol interface. A protocol processor is connected to a data link library and accesses appropriate programs in the data link library to achieve the Winsock protocol acceleration.

10 Claims, 6 Drawing Sheets

WINSOCK-DATA LINK LIBRARY TRANSCODER

RELATED APPLICATIONS

This application claims priority to provisional application 60/040,113, filed Mar. 7, 1997.

BACKGROUND OF THE INVENTION

1. Field of the Invention

The invention relates to a hardware accelerator that accomplishes Winsock protocol acceleration. More particularly, the invention relates to hardware that provides scalable acceleration for processes that call the Winsock data link library (DLL), in which the hardware is detected by the operating system and application program interfaces are routed to hardware acceleration.

2. Background of the Invention

Computer systems require protocol software to communicate with other computers or devices. The protocol software sends information in a particular format, and also receives data in a particular format. Protocols that are commonly used in conventional computer systems include TCP/IP and APPLETALK, as well as many others. The protocol software is typically part of the operating system of the computer.

Operating systems in most computers support multiprogramming, in which multiple application programs are executed simultaneously. Typically, these application programs are run in a time division multiple access structure, in which each application program obtains the entire computer resources for its particular time frame. When executed, an application program runs a particular application, such as "time of day."

An important feature of computer systems is the interface between protocol software and the application programs resident in the computer. Currently, there do not exist standards specifying how application programs interact with protocol software. Since protocol software resides in the operating system of the computer, the interface with application programs depends on the operating system being used (i.e., DOS, OS/2, Windows).

A Winsock interface has been developed, which provides socket functionality for Microsoft Windows. The Winsock interface permits application programs that make socket calls to run Microsoft Windows.

Another important aspect of computer systems is the client-server function. The term "server" applies to any program that offers a service that can be reached over a network. The server accepts the request, typically via a socket assigned to the server. The server then services the request, and transmits the results back to the client. The server then awaits another request.

The term "client" refers to the device that made the request. For example, an executing application program becomes a client when it sends a request to a server and awaits the response. An example of a server is a file server, which receives requests to perform operations that store or retrieve data from a file. The file server performs the requested store/retrieve function, sends the data to the requesting party (the client), and waits for the next request.

A conventional interface between TCP/IP protocol software and application programs running on a UNIX operating system is presented herein. In the UNIX operating system, an application program interacts with the operating system by making system calls. System calls look like other procedure calls from a programmer's perspective, in that they take arguments and return one or more results. Arguments can be binary values or pointers to objects in the application program.

The UNIX input/output (I/O) system uses the "open-read-write-close" paradigm. In this paradigm, a user process calls "open" to specify the file or device to be used and obtains permission to use the file or device. The call to "open" returns a file descriptor, which is an integer value that the process uses when performing I/O operations on the opened file or device.

Once the object is opened, the user process makes one or more calls to "read" or "write" to transfer data to/from the file or device. "Read" transfers data to the user process from the file or device, and "write" transfers data to the file or device from the user process. After all I/O operations are completed, the user process calls "close" to notify the operating system that it has finished using the object.

For input/output operations through a network of devices, the UNIX system utilizes the concept of a "socket." The socket can either be part of the operating system or it can be a library routine that provides a socket interface. The term "socket" provides an endpoint for communication to another device. As with file access, an application program makes a request to the operating system for a socket, and the operating system creates a socket for use by the requesting application program. The operating system returns an integer value that the application program uses to reference the newly created socket.

The main difference between file descriptors and socket descriptors is that the operating system binds a file descriptor to a specific file or device when the application program calls "open", but the operating system can create a socket without binding the socket to a specific destination address. That way, the application program can either supply a destination address each time it uses the socket (i.e., each time it sends a packet of data), or it can bind the destination address to the socket to avoid repeatedly having to specify the destination for data transfers over the same socket.

Like file and device I/O data transfers, data transfers over a socket use operations like read and write. When an application program creates a socket and creates a TCP connection from the socket to a foreign destination, the application program can use "write" to send data across the connection, and the application program at the other end can use "read" to receive the data. In order to allows primitives like "read" and "write" to be used for files, devices and sockets, the operating system allocates socket descriptors and file descriptors from the same set of integer values, so that a particular integer value is either a socket descriptor or a file descriptor, but not both.

In the UNIX operating system, an application program can request a socket on demand. Based on this socket request, the operating system returns a result which includes a first argument specifying the protocol family to be used for the newly created socket (e.g., TCP/IP, PUP internet, APPLETALK), a second argument specifying the type of communications desired (e.g., reliable stream delivery service, connectionless datagram delivery service), and a third argument specifying the specific protocol within the protocol family that is to be used.

At any particular time when the computer is running, there may be various sockets that are open and being used by application programs that are currently being executed. In order to start a new application program, a separate copy of the currently executing application program (or programs) is created, and the new copy replaces itself with the desired application program. The newly created copy then has access to all open sockets as well as all open files. The operating system keeps a reference count associated with each socket, so that it knows how many application programs have access to each socket.

Since both old and new processes have the same access rights to existing sockets, the programmer must ensure that the two processes use the shared sockets without affecting each other. When a process finishes using a socket, it calls "close", and the socket is then no longer usable. When a process terminates for any reason, the operating system closes all sockets accessible by that process.

Initially, a socket is created without it being associated with a local address or a destination address. For TCP/IP protocols, this means that a local protocol port number has not been assigned and a destination port or IP address has not been specified. In many cases, an application program does not care about the local address that it uses, and it is willing to allow the protocol software to choose an address for it. However, a server process that operates on a specified port must be able to specify that port, since that is the only way clients know where to access the server. Once a socket has been created, the server uses the "bind" system call in UNIX to establish a local address for it.

Initially, a socket is created in the unconnected state, so that the socket is not associated with any particular foreign destination. The system call "connect" in UNIX binds a permanent destination address to a socket, and places the socket in the connected state. An application program must first call "connect" to establish a connection before it can transfer data through a socket using a reliable stream datagram service. However, a socket that uses a connectionless datagram service does not need to be connected before it can be used.

Once an application program has established a socket, it can use the socket to transmit data and receive data. In UNIX, there are five possible operating system calls which can be used to send data over a socket: send, sendto, sendmsg, write, and writev. Send, write and writev only work for connected sockets because they do not allow the caller to specify a destination address.

Similarly, in UNIX, there are five possible operating system calls which can be used to receive data over a socket: read, read, recv, recvfrom, and recvmsg. The read system call can only be used when the socket is connected.

Additional operating system calls allow for a newly created process to determine the destination address of an already-existing socket (getpeername), and to obtain and set particular socket options (getsockopt, setsockopt).

For servers, which have a well-known protocol port that all clients can access to submit requests thereto, the operating system call "listen" is used to allow a server to place its socket in a passive mode that is ready to accept connections. The server can also inform the operating system that the protocol software should queue multiple simultaneous requests from different clients that arrive at the socket. If the queue is full when a request arrives, the operating system will refuse the connection and discard the request.

Once a socket has been established, the server waits for a connection, by using the operating system call "accept." When a request arrives, the operating system informs the server of the address of the requesting client, and the operating system creates a new socket that has its destination address connected to the requesting client. The operating system also returns the new socket descriptor to the caller.

The original socket remains open, so that the server can continue to accept requests from other clients at the original socket.

When a connection request arrives, the server can either handle the request iteratively or concurrently with other requests. In the iterative approach, the server handles the request itself, closes the new socket, and then call "accept" to obtain the next connection request. In the concurrent approach, after the call to "accept" returns, the server creates a slave process to handle the request. The slave process inherits a copy of the new socket, so it can proceed to service the request. When it finishes, the slave process closes the socket and terminates its own process. The original (i.e., master) server process closes its copy of the new socket after starting the slave process. It then calls "accept" to obtain the next connection request.

The socket interface has currently become popular and is widely supported by many vendors. Vendors who do not offer socket facilities in their operating systems often provide a socket library that makes it possible for programmers to write applications using socket calls even though the underlying operating system uses a different set of system calls.

One such socket interface that is widely used is the Winsock interface, or Winsock, which allows application programs to make socket calls to run with Microsoft Windows, as described earlier. However, with this system, there is not currently available a system that provides for protocol acceleration using Winsock.

SUMMARY OF THE INVENTION

It is an object of the present invention to allow for Winsock protocol acceleration using hardware devices.

This and other objects are achieved by a Winsock protocol acceleration system for a plurality of application programs run by a main processor. Each of the application programs has a corresponding application program interface. The system includes a protocol processor coupled to the main processor via a first bus. The system also includes a data link library coupled to the protocol processor via a second bus and configured to store programs needed to convert data from the application programs to one of a plurality of interface protocols. The system further includes a plurality of hardware decoders coupled to the protocol processor and each configured to decode data received from one of the application programs to a corresponding one of the interface protocols. The protocol processor provides control of the system to access the data link library to retrieve one or more of the programs stored therein to allow for data transmission over a desired interface protocol for one of the application programs.

This and other objects are also achieved by a Winsock protocol acceleration system for a plurality of application programs. Each of the application programs has a corresponding application program interface. The system includes a Winsock socket for sending information to and from a Windows operating system. The system also includes a protocol processor. The system further includes a data link library coupled to the protocol processor and configured to store a plurality of data frames needed to convert data from the application programs to one of a plurality of interface protocols. Each of the data frames includes a header field and a data field. Lastly, the system includes a plurality of hardware decoders coupled to the protocol processor and each configured to decode data received from one of the application programs to a corresponding one of the interface protocols. The protocol processor accesses the data link library to retrieve one of the data frames stored therein to allow for data transmission over a desired interface protocol for one of the application programs. A corresponding header of the one of the data frames includes executable code for performing a particular protocol for data that is sent to and from the one of the application programs via the Winsock socket.

BRIEF DESCRIPTION OF THE DRAWINGS

These and other objects and advantages of the invention will become more fully apparent from the following detailed description when read in conjunction with the accompanying drawings, with like reference numerals indicating corresponding parts throughout, wherein.

DETAILED DESCRIPTION OF THE PREFERRED EMBODIMENTS

The system according to the invention provides a hardware accelerator to perform Winsock protocol acceleration. The system provides scalable acceleration to processes that call the Winsock. The hardware is detected by the operating system of the computer, and application programs are routed via application program interfaces (APIs) to the protocol acceleration system to provide for faster transfer of data.

Figure 1:
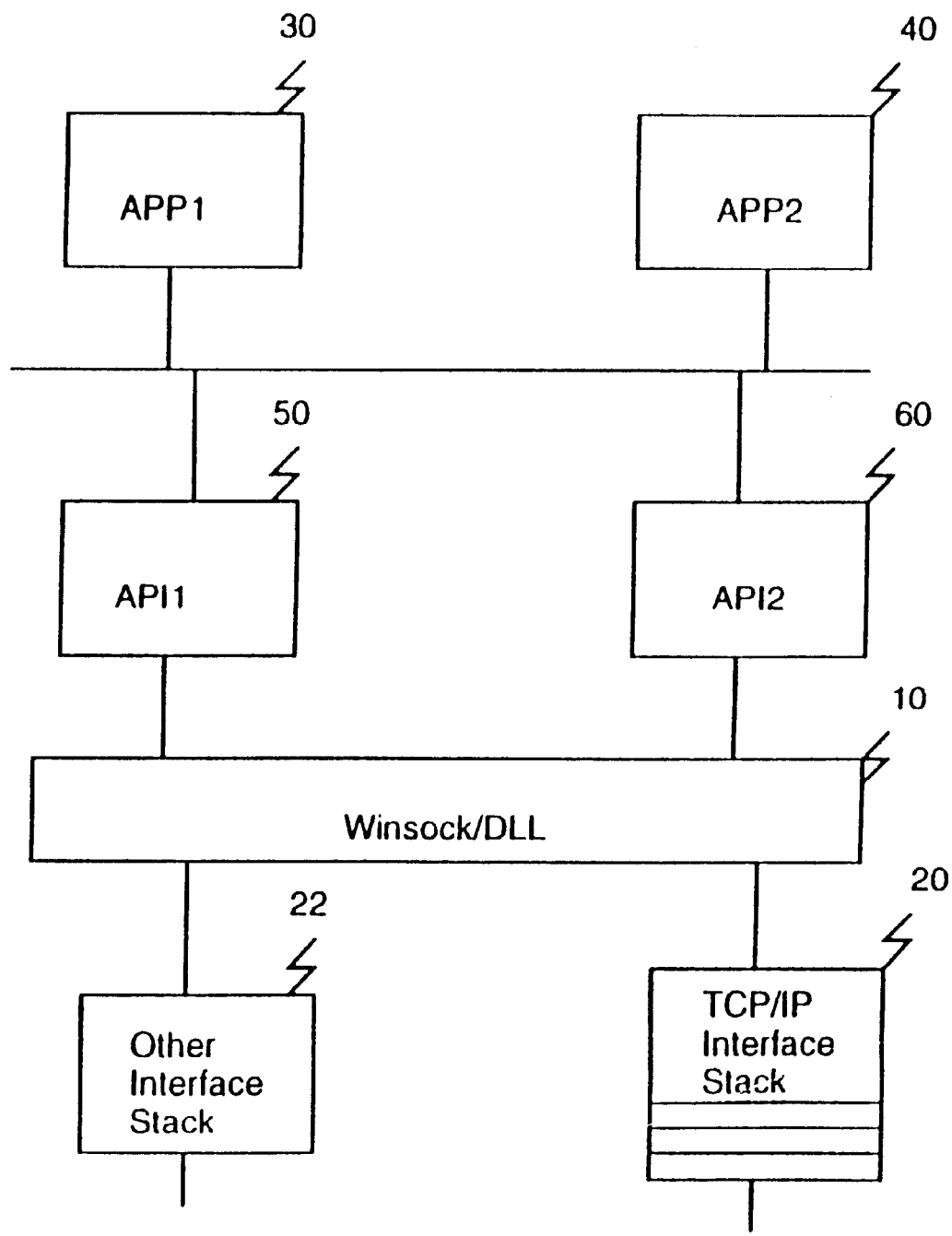
FIG. 1 is a block diagram of the system according to one embodiment of the invention.

The Winsock/data link library (Winsock/DLL) interface layer of the system according to the invention is located between the protocol interface stack and the APIs. In FIG. 1, there is shown a TCP/IP interface stack 20, as well as an "Other" interface stack 22. Additionally, there can be envisioned other interface stacks besides the two shown interface stacks 20, 22 that the Winsock/DLL interface layer 10 is connected to. As shown in FIG. 1, a first application program (APP1) 30 and a second application program (APP2) 40 desire access to the INTERNET (via NETSCAPE, for example). Each of these two application programs APP1, APP2 interface with the Winsock/DLL interface layer 10 via the respective APIs 50, 60. The Winsock/DLL interface layer 10 is preferably implemented as a single silicon chip or wafer.

Figure 2:
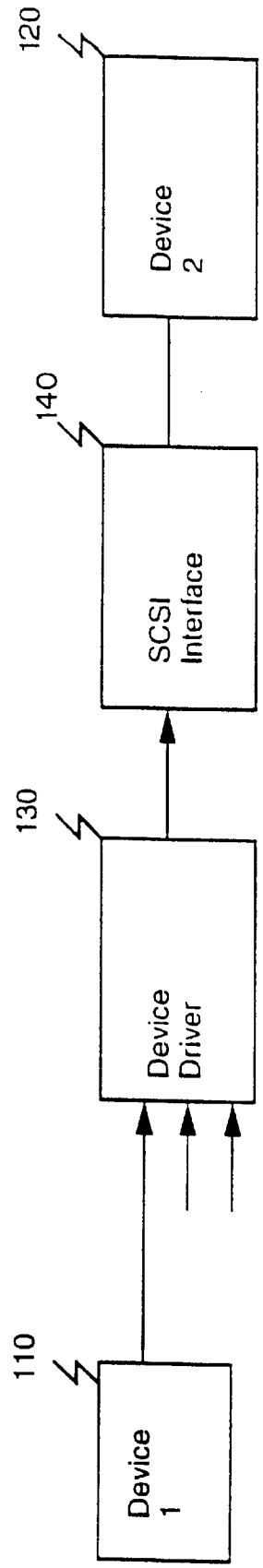
FIG. 2 is a block diagram of the system according to another embodiment of the invention.

As an alternative embodiment of the system according to the invention, as given in FIG. 2, there is shown a first device 110 that accesses a second device 120 via a device driver 130 and a small computer system interface (SCSI) protocol interface 140. The SCSI protocol is basically a simple handshaking protocol for sending data between computers. Conventionally, the SCSI protocol interface 140 is a software interface, but in the alternative embodiment, both the device driver 130 and the SCSI protocol interface 140 are implemented in hardware. In this analogous system, the SCSI protocol interface 140 is adapted in hardware to include the functions of the device driver 130, and both functions are incorporated on a single chip.

Figure 3:
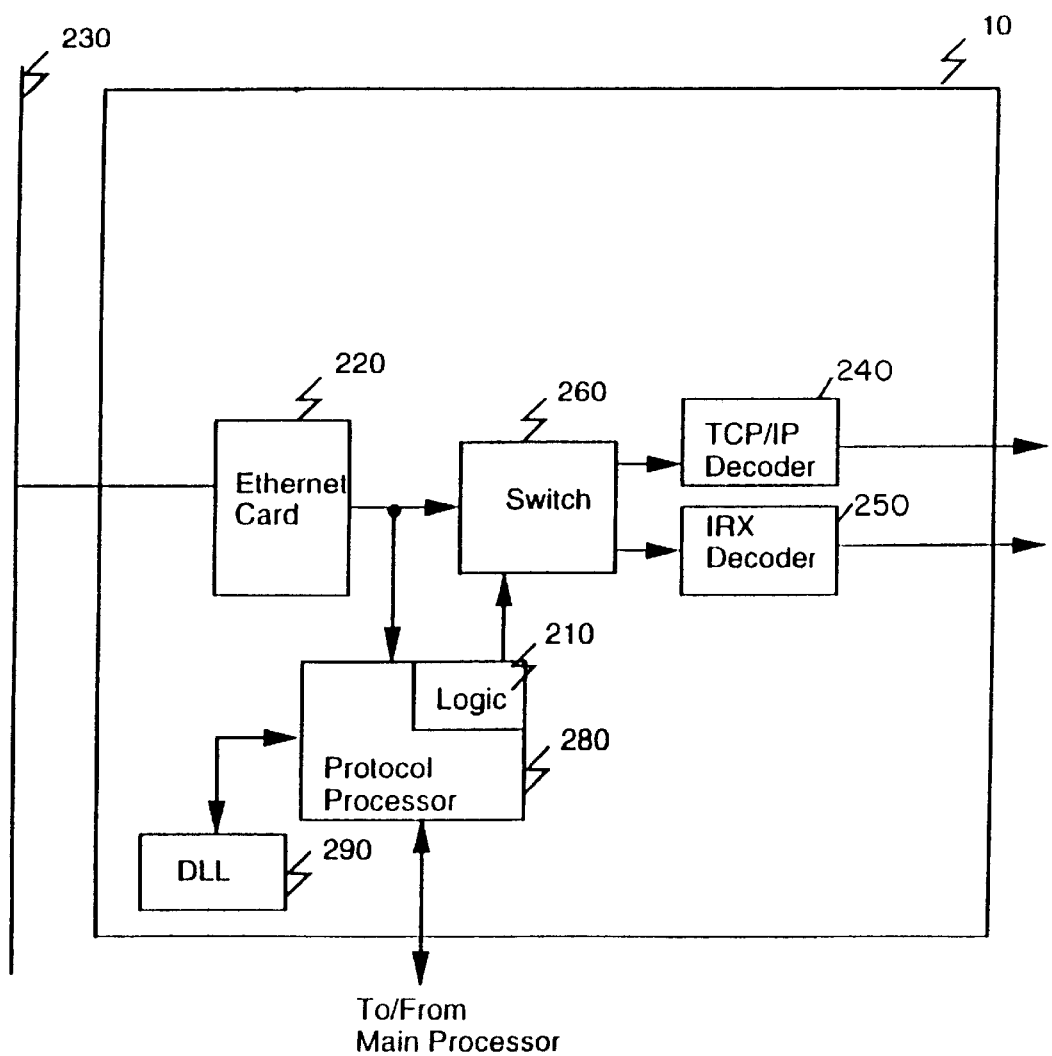
FIG. 3 is detailed block diagram of the Winsock/DLL interface layer of the system according to the invention.

In the system according to the invention, the Winsock/DLL interface layer 10 is configured to communicate with different interface protocols, such as TCP/IP, IRX, or APPLETALK. As shown in FIG. 3, the Winsock/DLL interface layer 10 also includes control logic 210 in a protocol processor 280 which provides the connectivity for a particular protocol. The Winsock/DLL interface layer 10 also includes an Ethernet card 220 to interface with other devices connected to it via a bus 230. The bus 230 may be constructed as twisted pair cables, fiber optic cables, or other wired and/or wireless media.

The Winsock/DLL interface layer 10 also includes a plurality of protocol decoders 240, 250, one for each protocol interface that may be used in the system according to the invention. The system in shown in FIG. 3 having a TCP/IP decoder 240 and an IRX decoder 250, but it could have other hardware decoders to support other interface protocols, as desired. Each of the protocol decoders are conventionally implemented in software, but in the preferred embodiment, these decoders 240, 250 are implemented in hardware.

The Winsock/DLL interface layer 10 is controlled by a protocol processor, preferably one, manufactured by AMD. The protocol processor performs a large number of computations per second, which allows for quick reprogrammability for the Winsock/DLL interface layer 10 to another protocol, as needed.

The switching between the various decoders in the system according to the invention is shown via a switch 260, under control of the control logic 210, as shown in FIG. 3. The switching could also be performed via logic circuits (not shown).

In the system according to the invention, the protocol processor 280 performs frame separation of the received data. Based on this frame separation capability, the protocol processor 280 knows where to look for certain parts of the data stream, such as the header information and the destination address.

The decoders 240, 250 are implemented in hardware so that the system need not depend on software speeds (such as the CPU clock), and thus are as fast as currently available silicon-implemented devices. The increased speed of using hardware decoders over a software-implementation of the decoders greatly enhances the utility of the Winsock/DLL interface layer 10 over conventional application program/protocol layer conversion devices.

Further, since the decoders 240, 250 are implemented in hardware, a main processor is not tied up performing protocol processing. Thus, the main processor has increased bandwidth that can be used to support other functions. For example, if the main processor is used to play a video game, such as DOOM, which requires complex, interactive displays, the game can be run at a faster speed than it would be if the main processor was also tied up in the protocol processing function.

Figure 4:
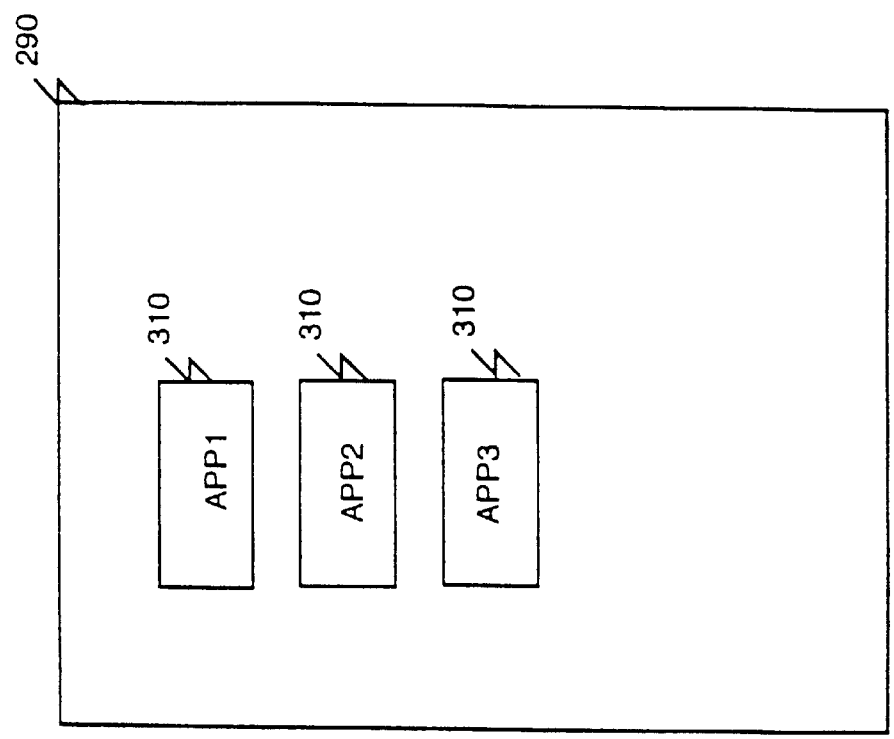
FIG. 4 shows various programs that are stored in the DLL of the system according to the invention.

The data link library (DLL) of the system according to the invention includes software that allows the APIs to communicate over a desired interface protocol. The DLL can be configured as a set of APIs 310, as shown in FIG. 4, with the set of APIs 310 used to provide connectivity to a desired protocol interface for each of the application programs currently being executed.

For Winsock, the APIs are standardized by Microsoft Corporation, and the system according to the invention is constructed so as to be compatible with these standardized APIs. In the system according to the invention, the APIs are used as output ports, that is, registers, which indicate where certain information can be retrieved from.

Figure 5:
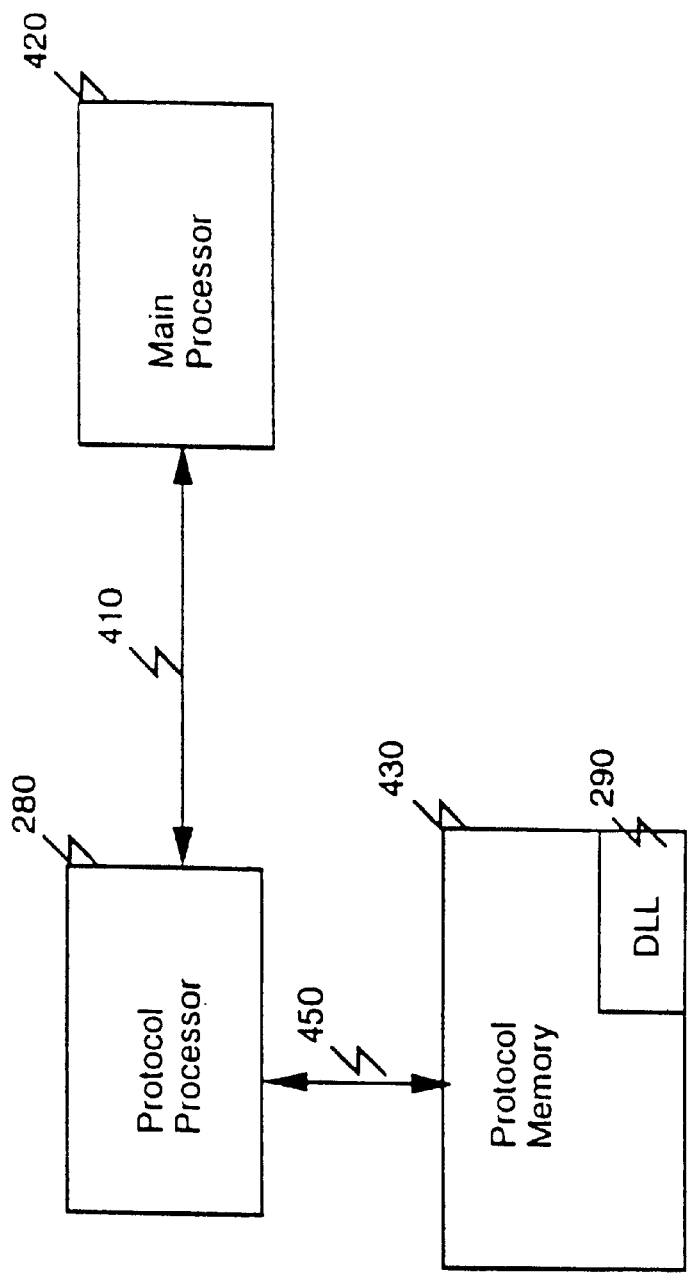
FIG. 5 is a diagram showing the connectivity between the main processor, the protocol processor and the protocol memory of the system according to the invention.

The protocol processor 280 of the system according to the invention is also shown in FIG. 5. The protocol processor 280 is located in the Winsock/DLL interface layer 10. In FIG. 5, the protocol processor 280 is connected via a first bus 410 to the main processor 420. The first bus 410 allows for data to be sent to and from the main processor 420 and the protocol processor 280. The protocol processor 280 is also connected to a protocol memory 430 (where the DLL 290 is stored) via a second bus 450. By this configuration, data required for protocol conversion is retrieved by the protocol processor 280 from the protocol memory 430, and that data is passed on to the main processor 420, as required.

In another example of the system according to the invention, header information in a frame of data can also include protocol information, for example, whether a new protocol is to be used for subsequent frames of data. The header includes an address pointer to executable code (e.g., a ".exe" file) in the protocol memory 430 for a new protocol to be used. The protocol processor 280 will run the .exe file as pointed to in the header to perform the transition to the new protocol.

Figure 6:
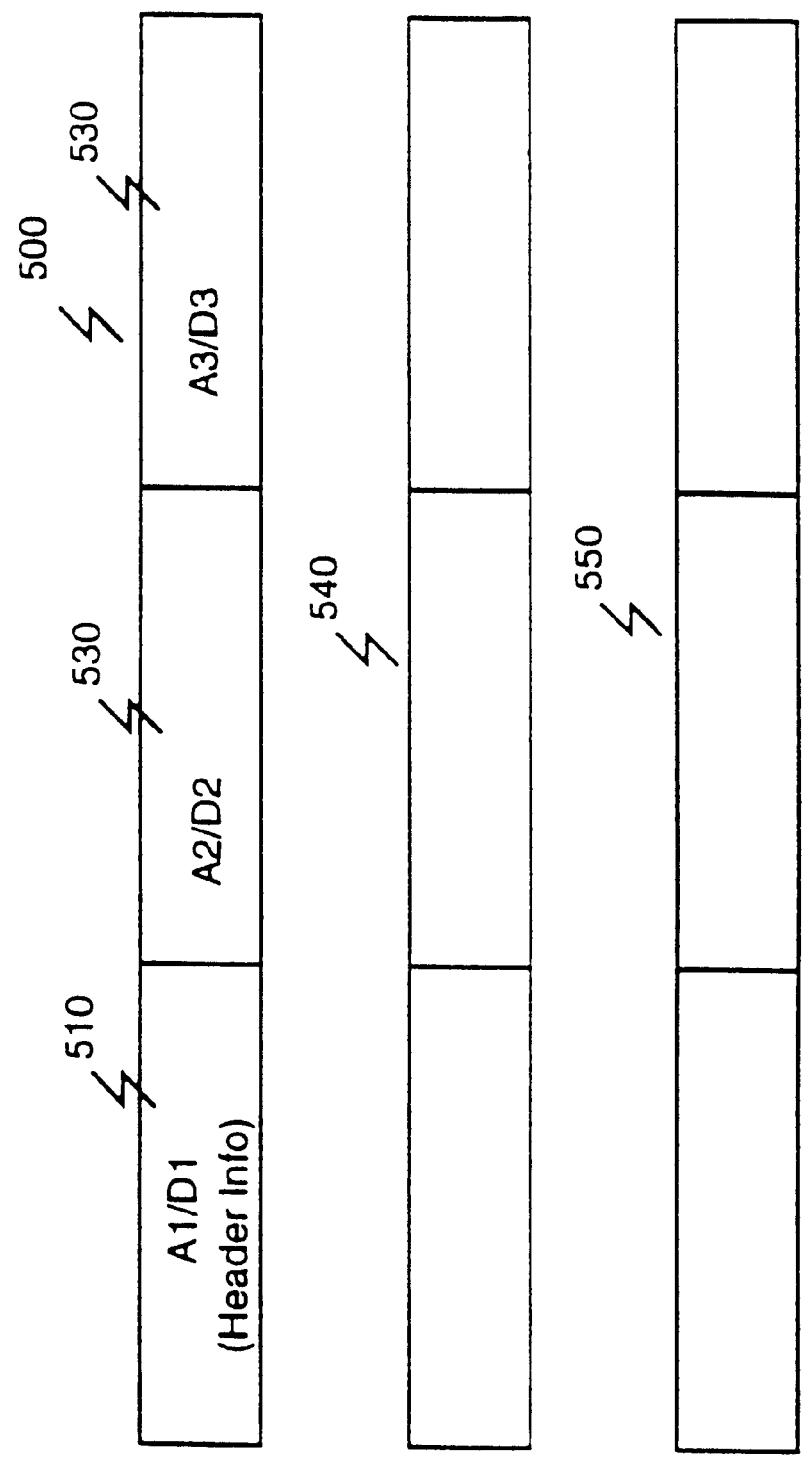
FIG. 6 is a diagram of a data field that contains an executable file that can be used in the system according to the invention.

A data stream of one frame of data used in the system according to the invention is shown in FIG. 6. In FIG. 6, the Address/Data field 510 of the first block of a frame is used by the executable in the protocol processor 280 for processing the other information in the same block or in subsequent blocks 540, 550.

Alternatively, there can be a flag (i.e., 1 bit of data) in the header that indicates whether there is an executable in the first block or not. If there is an executable in the first block as indicated by the flag, then the executable is loaded and it can be run. If there is not an executable in the first block, then the current executable is kept running on all blocks of the next frame.

While there has been illustrated and described what is at present considered to be exemplary embodiments according to the invention, it will be understood by those skilled in the art that various changes and modifications may be made, and equivalents may be substituted for elements thereof without departing from the true scope of the invention. In addition, many modifications may be made to adapt to a particular situation or material to the teachings of the invention without departing from the central scope thereof. Therefore, it is intended that this invention not be limited to the particular embodiments disclosed as the best mode contemplated for carrying out the invention, but that the invention will include all embodiments falling within the scope of the appended claims.

What is claimed is:

1. A Winsock protocol acceleration system for a plurality of application programs run by a main processor, each of said application programs having a corresponding application program interface, the system comprising:

a protocol processor coupled to said main processor via a first bus;

a data link library coupled to said protocol processor via a second bus and configured to store programs needed to convert data from said application programs to one of a plurality of interface protocols;

a plurality of hardware decoders coupled to said protocol processor and each configured to decode data received from one of said application programs to a corresponding one of said interface protocols;

an interface card coupled between said plurality of hardware decoders and said application program interfaces, said interface card providing for transfer of data over a communications bus to and from said application program interfaces and said hardware decoders; and a logic circuit connected to said protocol processor and said hardware decoders, said logic circuit receiving a control signal from said protocol processor to connect one of said hardware decoders to said interface card to thereby provide a particular protocol interface for said one of said application programs, wherein said protocol processor provides control of said system to access said data link library to retrieve one or more of said programs stored therein to allow for data transmission over a desired interface protocol for one of said application programs.

2. A Winsock protocol acceleration system for a plurality of application programs, each of said application programs having a corresponding application program interface, the system comprising:

a Winsock socket for sending information to and from a Windows operating system;

a protocol processor;

a data link library coupled to said protocol processor and configured to store a plurality of data frames needed to convert data from said application programs to one of a plurality of interface protocols, each of said data frames including a header field and a data field; and a plurality of hardware decoders coupled to said protocol processor and each configured to decode data received from one of said application programs to a corresponding one of said interface protocols, wherein said protocol processor accesses said data link library to retrieve one of said data frames stored therein to allow for data transmission over a desired interface protocol for one of said application programs, and wherein a corresponding header of said one of said data frames includes executable code for performing a particular protocol for data that is sent to and from said one of said application programs via the Winsock socket.

3. The system as recited in claim 8, further comprising:

an interface card coupled between said plurality of hardware decoders and said application program interfaces, said interface card providing for transfer of data over a communications bus to and from said application program interfaces and said hardware decoders.

4. The system as recited in claim 8, further comprising:

a switch connected to said protocol processor and said hardware decoders, said switch receiving a control signal from said protocol processor to connect one of said hardware decoders to said interface card to thereby provide a particular protocol interface for said one of said application programs.

5. The system as recited in claim 9, further comprising:

a logic circuit connected to said protocol processor and said hardware decoders, said logic circuit receiving a control signal from said protocol processor to connect one of said hardware decoders to said interface card to thereby provide a particular protocol interface for said one of said application programs.

6. The system as recited in claim 9, wherein said interface card is an Ethernet card.

7. The system as set forth in claim 8, wherein said Winsock socket, said protocol processor, said data link library, and said plurality of hardware decoders are each disposed between said application program interfaces and said interface protocols to provide a connectivity therebetween.

8. The system as set forth in claim 2, wherein the protocol processor processes succeeding data frames using the executable code for performing the particular protocol obtained from the one of the data frames until another data frame is received containing other executable code for performing a protocol other than the particular protocol.

9. The system as recited in claim 8, further comprising a protocol memory accessible by said protocol processor, wherein the executable code obtained from the corresponding header includes an address pointer to executable code stored in said protocol memory for a new protocol to switch to.

10. The system as recited in claim 8, wherein a corresponding header of each of the data frames includes an indicator flag that indicates whether or not executable code is stored in each said corresponding header, and wherein said protocol processor reads the indicator in each of the data frames to determine when to switch to another protocol by reading the other executable code in the another data frame that has its corresponding indicator flag set to indicate that executable code is stored in the corresponding header of the another data frame.

* * * * *